N. K. WILCOX.
TRACTION WHEEL.
APPLICATION FILED JUNE 15, 1916.

1,275,812.

Patented Aug. 13, 1918.
2 SHEETS—SHEET 1.

INVENTOR:
NEWTON K. WILCOX
BY Albert H. Baker
ATTY.

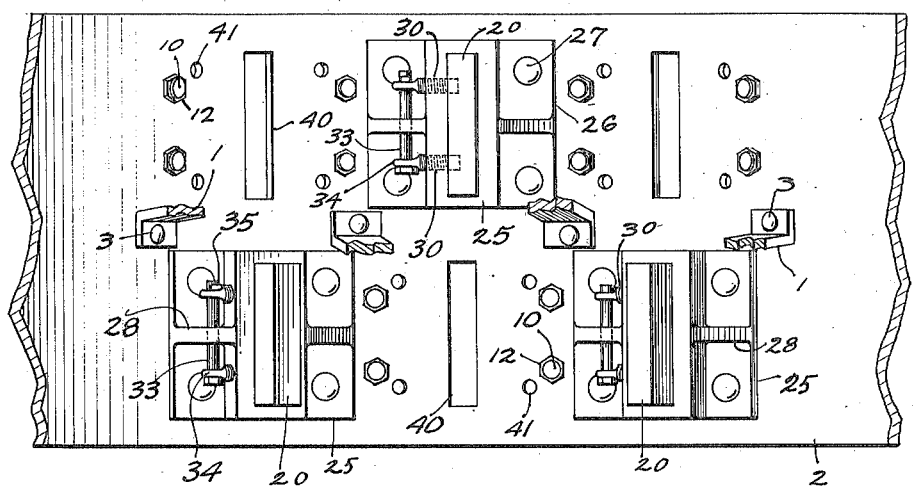
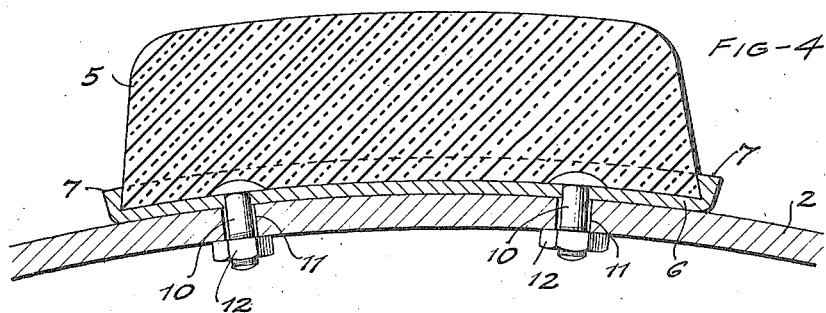
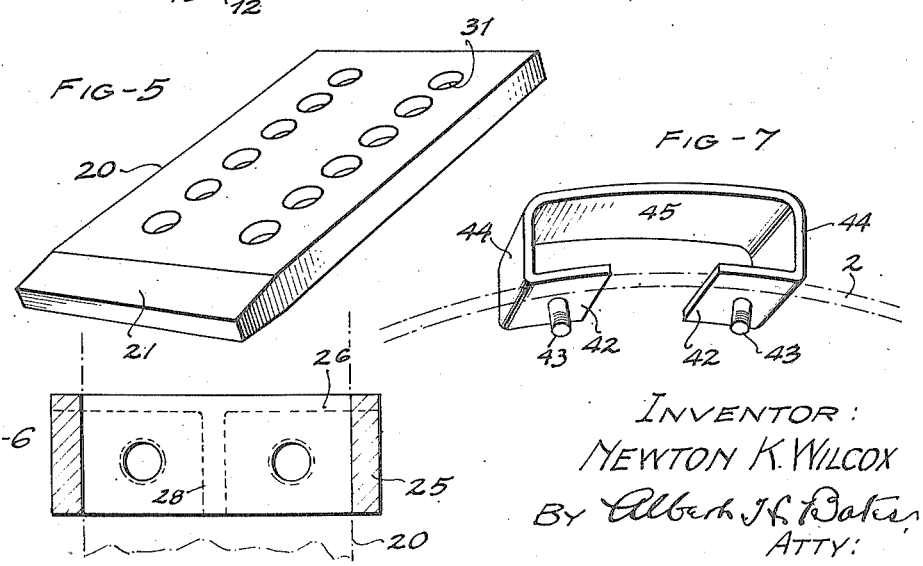

UNITED STATES PATENT OFFICE.

NEWTON K. WILCOX, OF PROVIDENCE, RHODE ISLAND.

TRACTION-WHEEL.

1,275,812.   Specification of Letters Patent.   Patented Aug. 13, 1918.

Application filed June 15, 1916. Serial No. 103,800.

*To all whom it may concern:*

Be it known that I, NEWTON K. WILCOX, a citizen of the United States, residing at Providence, in the county of Providence and State of Rhode Island, have invented a certain new and useful Improvement in Traction-Wheels, of which the following is a full, clear, and exact description, reference being had to the accompanying drawings.

This invention relates to traction or propelling wheels for motor-driven vehicles, such as automobile trucks, tractors and the like. The general object of the invention is to so construct the traction wheel that it may carry yielding tread members, and calks or spurs adapted to be projected outwardly from the periphery of the wheel or withdrawn to points within the same. A further object is to so arrange the calks or spurs that they may stand entirely within the rim of the wheel or be projected outwardly therefrom. Another object is to provide means for removably securing the yielding tire members to a comparatively smooth rim, so that when such members are removed the wheel may run on the rim.

A traction wheel constructed according to my invention may be used for many purposes, on soft or hard roadways or on yielding ground, and suitable traction may be obtained under any of these conditions. The invention obviates the difficulties incident to the use of removable chains, or cleats and like devices for securing traction.

My invention is hereinafter more fully described in connection with the accompanying drawings, and its essential characteristics are summarized in the claim.

Figure 1:
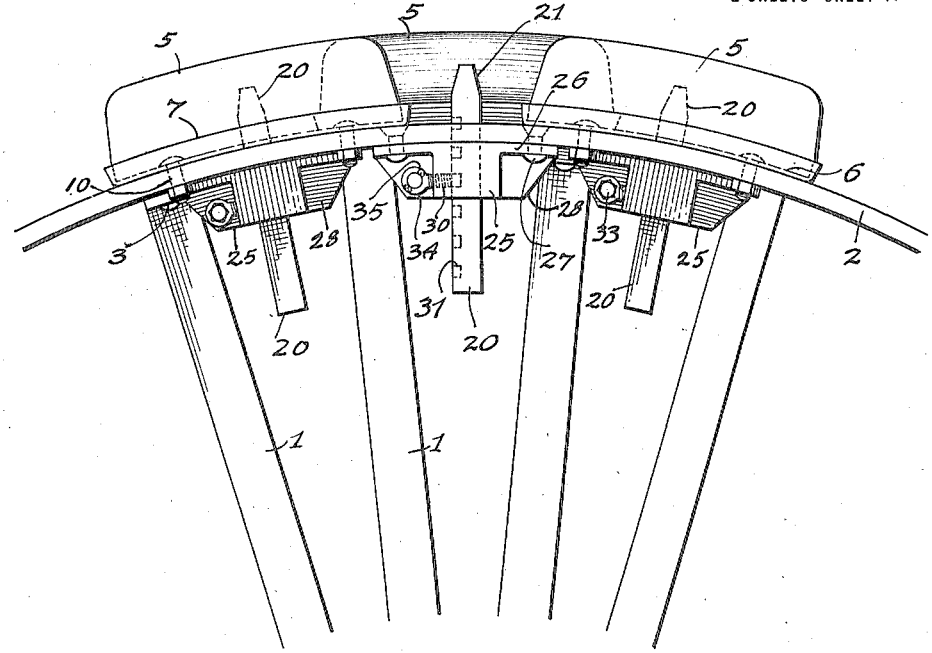
Figure 2:
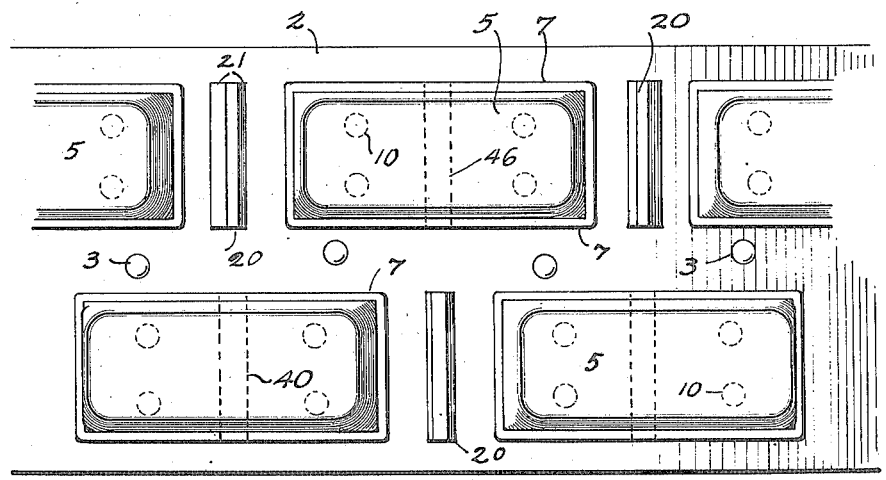

In the drawings, Figure 1 is a side elevation of a portion of a traction wheel embodying my invention, the figure showing the tread, rim and portion of the spokes; Fig. 2 is a plan of the same; Fig. 3 is a sectional view of the parts shown in Fig. 1 looking outwardly toward the inside of the rim; Fig. 4 is a sectional detail on an enlarged scale of one of the resilient tread members and its securing means; Fig. 5 is a perspective view of one of the spurs; Fig. 6 is a cross sectional detail of one of the guides for such spurs; Fig. 7 is a perspective view of a modified form of tread member.

The drawings illustrate my invention embodied in a wheel, such as are used for farm tractors having metal spokes 1, extending outwardly to the substantially cylindrical metal rim 2, the outer ends of the spokes being secured to this rim by rivets 3, extending through laterally bent ears of the spokes. The wheel may be used without any projections or tire portions outside of the rim 2, thus presenting to the ground a flat smooth tread surface, which may be useful in many places, such as on hard soil or country roadways.

For using the wheel on roadways presenting a hard surface, such as paved streets, it is desirable to provide resilient tire members. Accordingly, I have shown oblong rubber pads 5, carried in cleats 6, shown as fitting the periphery of the rim 2 and having overhanging flange portions 7, embracing the outwardly flaring base of the pads 5, which are preferably vulcanized to the cleats. Extending downwardly through the bottom of each cleat are bolts 10, which may be rigidly carried thereby and placed in position before vulcanizing the rubber pad to the cleat. These bolts extend through openings 11 in the rim, preferably slightly larger than the bolts, so that the bolts may be positioned radially, and the openings will be large enough to permit them to pass through even though they stand at a slight angle to the openings while being placed in position. Suitable nuts are indicated at 12, threaded onto the inner ends of the bolts for securing the cleats and pads 5 in position.

There are preferably two or more annular rows of these cleats and pads arranged end to end around the rim, and in order to provide an even and continuous tread, the individual pads are preferably offset with relation to the next row, as indicated in Figs. 1 and 2. The ends of these pads are preferably separated sufficiently to permit spurs 20 to be extended outwardly through the rim between them.

The spurs 20 are shown as comprising substantially flat plates having their outer ends beveled or sharpened slightly, as indicated at 21, and they are preferably slidable through openings in the rim and slidably embraced by guide members 25. These guide members preferably have a base 26 shaped to fit the curved inner surface of the rim 2 and secured thereto by suitable bolts or rivets indicated at 27. Integral with the base is a rectangular radially extending portion slidably embracing the body of the spur which is shown as secured against radial movement by screws 30, extending through the bracket and into depressions 31 in the side of the spur plate 20.

These screws preferably have their inner ends adapted to firmly seat in the cavities 31 which are arranged in rows extending substantially the length of the spur whereby a spur may be moved and secured in any of a number of positions from a point where the spur is within the periphery of the rim 2 to a point where it projects outwardly past the pads 5 a material distance.

To prevent the loosening of these screws 3, I have shown a transverse bolt 33 adapted to extend through eyelets 34 forming the heads of the screws and through a web 28 of the guide brackets in which position it may be secured by a suitable cotter pin indicated at 35. Thus when the screws 30 have been tightened onto the spur it is only necessary to bring the eyelets 34 into alinement so that the bolt 33 may be passed therethrough and secured by its cotter pin to firmly prevent loosening of the screws and inadvertent movement of the spurs.

From the foregoing description it will be seen that the pads and their securing cleats may be removed from the periphery of the wheel, and the spurs withdrawn to a point entirely within the periphery of the rim, thus presenting, as heretofore stated, a substantially smooth cylindrical tread. The pads may be secured in position, as described, thus presenting a resilient tire which in itself has a tendency to securely grip the roadway, and is adapted for hard surfaces and pavements.

When the pads are used the spurs may not be withdrawn entirely within the periphery but may be allowed to stand in the position shown in Fig. 1.

Now, if the vehicle on which my wheel is used is running over a soft yielding surface or muddy roadway, the spurs may be extended to positions beyond the pads 5, thus providing a positive traction. When the vehicle reaches a harder roadway, the spurs may be readily withdrawn again presenting only the soft pads.

When using the invention for farm tractor wheels and the like, it may be desirable to use either the smooth rim or the smooth rim with the spurs on such surfaces as soft or plowed ground, in which cases, the pads may be laid aside.

In Fig. 3 I have shown additional openings 40 providing for the use of additional spurs when it is not desired to use the pads. In order to provide for using, if desired, more spurs than those positioned to extend outwardly between the pads, I have shown suitable openings 40, through the rim for the spurs, and openings 41 for the bolts or rivets adapted to secure additional guide brackets to the rim.

A substitute for the pads 5 is illustrated in Fig. 7 which may comprise a comparatively rigid metal strip, having inwardly bent ears 42 through which bolts 43 may extend into the rim 2, and having outwardly extending portions 44 connected by a bridge portion 45. These metal members may be used instead of the pads 5, where it is not desired to use rubber pads and in case the outer ends of the spurs 21 become so distorted from extended use that they cannot be entirely withdrawn within the periphery of the rim. The principal use of these pads would be to comply with regulations prohibiting the use of cleats or spurs on wheels, on roadways of certain localities, and the metal pads may be manufactured much more cheaply than the rubber pads heretofore described.

Having thus described my invention, what I claim is:

In a wheel of the character described, the combination of a rim, box-like guides secured to the inner face thereof, spurs slidably mounted within the box-like guides and adapted to project through the rim of the wheel, said spurs being provided with two rows of recesses, two screws mounted in the wall of each guide, said screws being adapted to enter the recesses of the spur and being each provided with eyes, and a pin adapted to extend through the eyes of the two screws to prevent their rotating.

In testimony whereof, I hereunto affix my signature.

NEWTON K. WILCOX.